United States Patent Office 3,162,716
Patented Dec. 22, 1964

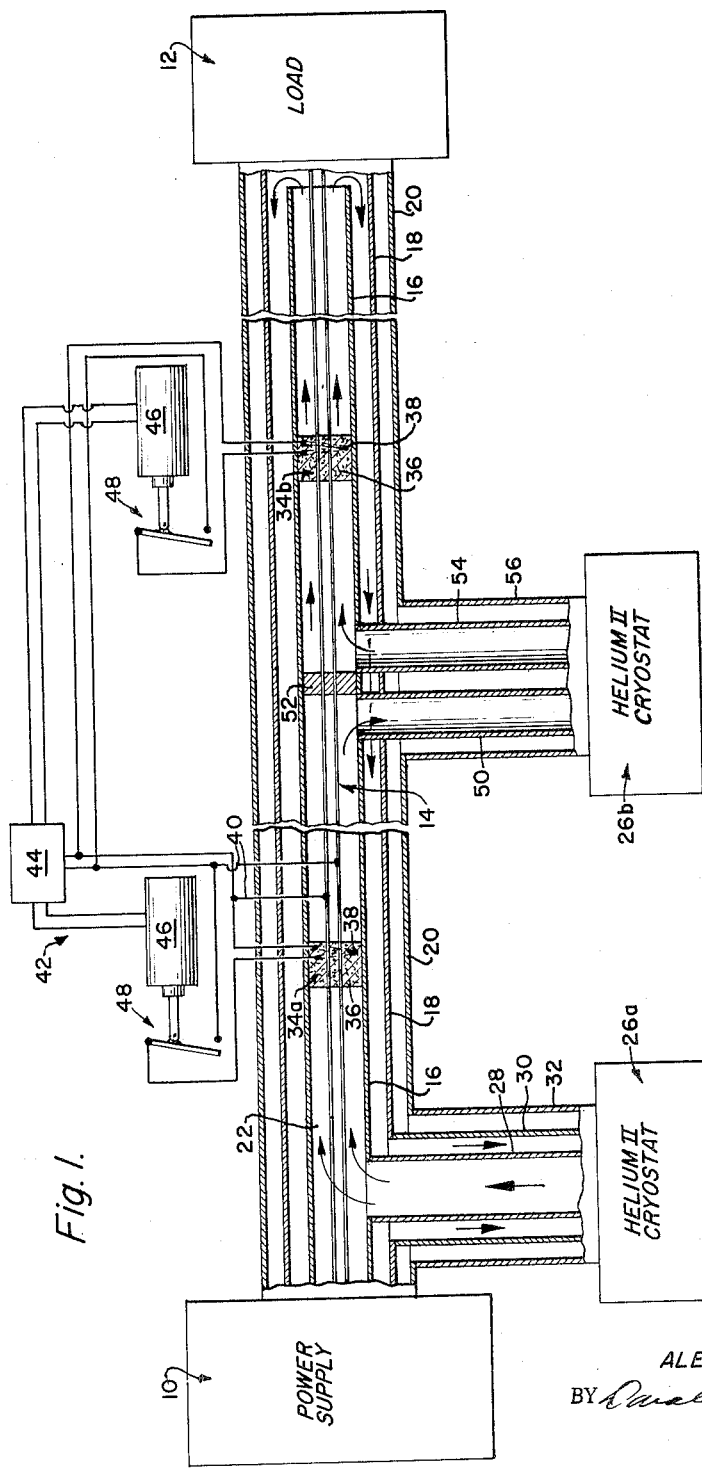

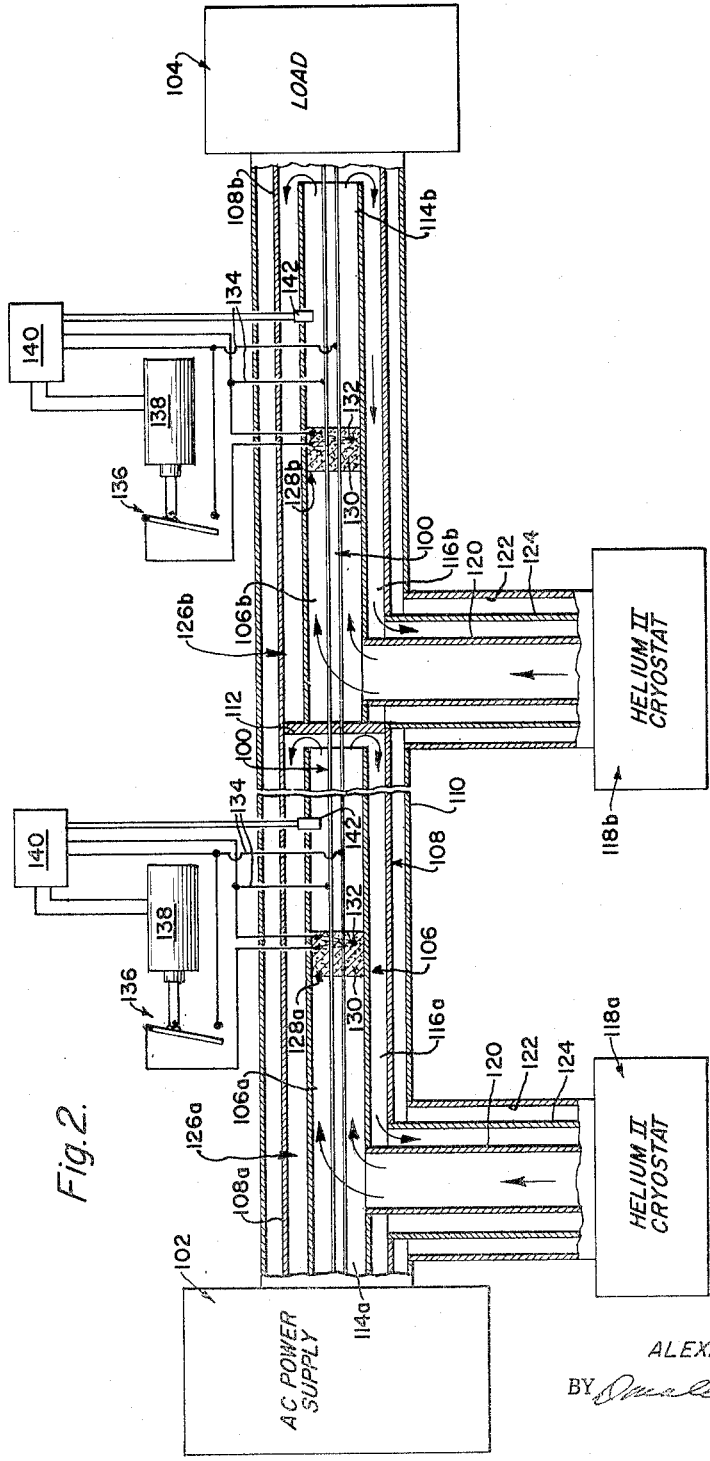

3,162,716
SUPER CONDUCTOR-POWER TRANSMISSION SYSTEM
Alexander Silver, Tarzana, Calif., assignor to The Garrett Corporation, Los Angeles, Calif., a corporation of California
Filed Oct. 15, 1962, Ser. No. 230,375
6 Claims. (Cl. 174—15)

This invention relates generally to electrical systems and particularly to improvements in electrical systems of the kind in which electrical conductors are maintained at low temperature to reduce their electrical resistance.

It is well known in the art that the electrical resistance of an electrical conductor decreases as the temperature of the conductor decreases. The electrical resistivity of most pure metallic elements at ordinary and moderately low temperatures, for example, is approximately proportional to the absolute temperature. At very low temperatures, however, the electrical resistivity of these elements approaches a residual value independent of temperature. On the other hand, certain electrically conductive elements and compounds exhibit a gradual reduction in electrical resistivity as the absolute temperature decreases to a critical temperature and then an abrupt decrease to what is presently believed to be mathematically zero resistivity as the temperature decreases below this critical temperature. These latter elements and compounds are commonly known in the art as superconducting elements and compounds, or simply as superconducting materials or superconductors. The critical temperature at which a superconductor exhibits an abrupt decrease in electrical resistivity or resistance is known as its transition temperature. This transition temperature of superconductors varies from one superconducting element or compound to another. One of the highest transition temperatures observed to date, for example, is that of the intermediate compound niobium-tin ($Nb_3Sn$), which is 18° K. A relatively high transition temperature is an asset, of coures, since it can be attained and maintained with greater ease and less complex and costly equipment than lower transition temperatures, such as that of aluminium, for instance, which is 1.175° K.

Electrical systems have been devised to utilize the low resistance of electrical conductors at low temperatures, and particularly the extremely low or zero resistance of superconductors at or below their transition temperatures. Electrical power transmission systems have been proposed, for example, in which an electrical transmission line is enclosed in a conduit filled with a refrigerant, such as a cryogenic fluid in its liquid phase. The cryogenic fluid or other refrigerant is maintained at the required low temperature by a refrigeration unit or cryostat connected to the conduit.

A general object of this invention is to provide an improved low temperature electrical system, such as an electrical power transmission system, in which provision is made for continuously recirculating a cryogenic fluid or other refrigerant through the system to maintain the electrical conducting elements of the system in their low resistance or superconducting state.

According to the preferred practice of the invention, for example, the electrical conducting elements, or electrical transmission line, to be refrigerated is enclosed in the innermost conduit of three concentric conduits. This inner conduit is supplied with a refrigerant, such as a cryogenic fluid in its liquid phase, from a refrigerator or cryostat. The refrigerant flows through the inner conduit to refrigerate the electrical elements therein and then returns to the refrigeration unit or cryostat through the annular flow space between the inner and intermediate conduits. After passage through and recooling in the refrigeration unit, the refrigerant is again recirculated through the inner conduit and then back to the refrigeration unit via the annular flow passage about the inner conduit. The annular space between the intermediate and outer conduits is preferably evacuated to minimize heat leak into the system.

A highly important object of the invention is to provide a low temperature, low resistance electrical system wherein the electrically conductive elements of the system are maintained in their low temperature, low resistance state by Helium II in the liquid phase and wherein further, the so-called "fountain effect" of liquid Helium II is utilized to circulate the latter through the system.

Another object of the invention is to provide a low temperature, low resistance electrical system of the character described wherein the circulation of the refrigerant is regulated in a new and improved way in response to a predetermined function, such as time or refrigerant temperature, whereby the latter is maintained at the low level required for minimum system resistance.

A further object of the invention is to provide a new and improved superconductor electrical power transmission system.

Other objects, advantages and features of the invention will present themselves to those skilled in the art as the description proceeds.

Briefly, the foregoing objects are attained in the present illustrative embodiment of the invention by enclosing an electrical transmission line, extending from an electrical power source to an electrical load, in the innermost conduit of three concentric conduits, as described earlier. This inner conduit is placed in communication with the outlet of a Helium cryostat, the inlet of the latter being in communication with the annular flow space about the inner conduit. The cryostat, the inner conduit, and the flow space about the inner conduit are filled with liquid Helium II.

According to the invention, therefore, there is provided a passage through which the liquid Helium II can recirculate from the cryostat outlet, through the inner conduit and over the transmission line therein, then around the outside of the inner conduit to the cryostat, and finally through the latter back through the inner conduit. At one or more positions in this flow passage is placed a porous plug, the downstream end of which is heated in such a way as to create the "fountain effect" referred to earlier and, thereby a hydrodynamic force which pumps the Helium II through the system.

According to the preferred practice of the invention, this plug is heated electrically by the action of a time-responsive or Helium-temperature-responsive control, whereby hydrodynamic pumping of the Helium II occurs periodically as required to maintain the transmission line at a desired low temperature. Preferably, the transmission line comprises a superconducting element or compound, such as niobium-tin, mentioned earlier, and the Helium II is periodically recirculated at a frequency sufficient to maintain the line at or below its transition temperature and, thereby, in its superconducting state.

A better understanding of the invention may be had from the following detailed description thereof taken in connection with the annexed drawings wherein:

FIG. 1 schematically illustrates an electrical power transmission system according to the invention; and FIG. 2 schematically illustrates a modified electrical power transmission system according to the invention.

Referring first to FIG. 1 of these drawings, there is illustrated an electrical power supply 10, an electrical load 12, and an electrical transmission line 14 for conveying electrical power from the supply to the load. When the transmission line 14 comprises two conductors, as shown, the latter are, of course, suitably electrically insulated from one another. In practice, the load 12 may be located some distance from the power supply 10. Transmission line 14 is enclosed in the innermost conduit 16 of three concentric conduits 16, 18 and 20. The intermediate and outer conduits 18 and 20 are closed at their ends in any convenient way. For convenience, the conduits have been diagrammatically illustrated as closed at one end by the power supply and at the other end by the load. It will become evident as the description proceeds, however, that the conduits may terminate in spaced relation to the supply and load and be closed by separate plugs. It is desirable, of course, to enclose as much of the transmission line as possible within the conduits.

At least one end of the inner conduit 16 is left open as shown, whereby the central opening 22 through the inner conduit communicates with the annular space 24 between the inner conduit, and the intermediate conduit 18. It will become evident as the description proceeds, however, that both ends of the inner conduit may be left open and in communication with the annular space 24.

According to one aspect of the invention, the central opening 22 through the inner conduit 16 and the annular space 24 about the latter conduit form a flow passage through which a refrigerant is recirculated to reduce the temperature and thereby the resistance of the transmission line 14. During its recirculation, this refrigerant passes through and is recooled by a refrigeration unit 26a having an outlet 28 communicating to the interior of the inner conduit 16 and an inlet 30, shown as surrounding the outlet 28 and surrounded, in turn, by an outer conduit 32. Inlet 30 communicates with the annular space 24 between the inner and intermediate conduits.

It is within the scope of this invention to effect recirculation of the refrigerant by a pump within the refrigeration unit or at some other location in the flow system. According to a further aspect and preferred practice of the invention, however, the refrigerant employed is liquid Helium II, the refrigeration unit 26a is a Helium cryostat, and the Helium is recirculated through the passages 22 and 24 by a pumping station 34a along the conduits which utilizes the "fountain effect" of liquid Helium II to produce the pumping effort required for recirculation. Pumping station 34a includes a porous barrier or plug 36 which is disposed in the Helium recirculation passage. In the drawings, for example, the porous plug of the pumping station 34a is fixed within the inner conduit 16. The "fountain effect" referred to above is produced by heating one end of the plug 36 and, as is well known, such heating creates a hydrodynamic force which causes a flow of Helium in one direction through the plug and hence through the Helium recirculation passage of the system. The direction of this flow through the plug is toward its heated end.

While the plug 36 may be heated in various ways, the drawing shows the plug to be heated by an electrical heating coil 38 contained in one end of the plug, i.e. the right-hand end of the plug, as the latter is viewed in FIG. 1. Energizing of the coil 38, therefore, induces a flow of Helium II to the right through the inner conduit and a resultant return flow of Helium II to the left through the annular space 24. Plug 36 may comprise a ceramic material or fine emery, for example, in which the coil 38 is embedded, as shown.

Heating coil 38 may be energized in any convenient way. In accordance with yet another aspect and preferred practice of the invention, however, the heating coil is energized by electrical energy extracted from the transmission line 14 via a tap 40 at the pumping station, such energization being periodic under the action of a condition responsive switching circuit 42. In FIG. 1, the condition to which the switching circuit 42 is responsive is time. To this end, the switching circuit 42 includes an electrical interval timer 44 which is energized via the tap 40 and operates to periodically energize solenoid 46 in the switching circuit 42 by electrical energy also derived through tap 40. Solenoid 46 operates a normally open switch 48 which, when closed by energizing of the solenoid, delivers electrical energy from tap 40 to the heating coil 38 to energize the latter. The interval timer 44 is set to effect periodic operation of the pumping station 34a at preselected time intervals which will assure maintenance of the transmission line 14 at or below the desired operating temperature.

As explained earlier, energizing of heating coil 38 induces a flow of Helium II to the right through conduit 16. In the case of a short transmission line, this Helium flow would continue directly to the open right-hand end of the latter conduit and would then reverse, flowing to the left through annular flow space 24, then through the cryostat 26a, and finally back into the left-hand end of the conduit 16.

In the case of a relatively long transmission line, it may be necessary to supplement the pumping station 34a with one or more additional pumping stations spaced along the line and/or to supplement the refrigeration unit or cryostat 26a with one or more additional refrigeration units or cryostats also spaced along the line. The drawings show one such additional pumping station 34b and one such additional refrigeration unit or cryostat 26b.

For simplicity, pumping station 34b has been illustrated as being identical to pumping station 34a. The second pumping station thus operates in precisely the same way as the first station. It is obvious, of course, that both pumping stations must induce Helium II flow in the same direction through the transmission system. This obviously requires the heating coils 38 of the two stations to be located at corresponding ends of their respective porous plugs 36, which are the right-hand ends of these plugs as the latter are viewed in the drawing.

It is further evident that the pumping stations along the transmission line (whether there are two or more such stations) must be synchronized for periodic operation in unison. This may be accomplished by providing each pumping station with an interval timer and appropriately setting and effecting synchronization of the several timers so that they actuate their pumping stations simultaneously. If the electrical power delivered through the transmission contains a periodic frequency, for example, the several interval timers could be synchronized directly from the power frequency. Otherwise, separate synchronizing means might be required. In the alternative, of course, all of the pumping stations may be controlled by a single common interval timer and all of the pumping stations may be energized through a single common transmission line tap, as is the case in the illustrated power transmission system. Thus, pumping station 34b is controlled by the timer 44 of pumping station 34a and is energized by electrical power derived through tap 40 of station 34a.

The second refrigeration unit or cryostat 26b comprises an inlet 50 communicating to the inner conduit 16 at one side of a partition 52 in the latter conduit and an outlet 54 communicating with the conduit 16 at the opposite side of this partition. Thus, Helium II flow through the system occurs from cryostat 26a, through conduit 16, then through cryostat 26b and back to conduit 16, and finally through annular flow space 24 back to cryostat 26a. The inlet and outlet of cryostat 26b are enclosed in an outer conduit 56 to minimize heat leak. Obviously, it is not essential that the number of pumping stations and the number of refrigeration units or cryostats be equal.

Reference is now made to FIG. 2 which illustrates a modified electrical transmission system according to the invention wherein the refrigerant, preferably Helium II as before, is periodically recirculated in response to the temperature of the Helium II, rather than time as in the first form of the invention, and wherein further there is embodied an alternate arrangement of multiple pumping stations and refrigeration units or cryostats. In FIG.

2 the electrical transmission line 100 extends from a power supply 102 to a load 104 through the innermost conduit 106 of three concentric conduits 106, 108 and 110 in a manner similar to the earlier form of the invention. In the system of FIG. 2, however, the inner conduit 106 comprises two or more separate sections for reasons which will appear as the description proceeds. In the drawings, for example, the inner conduit comprises two sections 106a and 106b.

Fixed within the intermediate conduit 108, between the conduit sections 106a and 106b, is a partition or wall 112. This partition effectively divides the intermediate conduit 108 into two isolated sections 108a and 108b. Transmission line 100 extends through this partition, as shown. Partition 112 is spaced from the adjacent end of inner conduit section 106a but is fixed to and closes the adjacent end of inner conduit section 106b. The central opening 114a through inner conduit section 106a, therefore, communicates with the annual flow space 116a about the latter section. The opposite end of conduit section 106b is open, whereby the central opening 114b through the latter conduit section communicates with the annular flow space 116b about conduit section 106b.

Associated with each inner conduit section 106a and 106b is a refrigeration or Helium cryostat 118a or 118b identical to those described earlier. These cryostats are located adjacent the closed ends of the inner conduit sections and have outlet conduits 120 communicating to their respective inner conduit sections in the same manner as in the system of FIG. 1. Surrounding these outlet conduits, and surrounded, in turn, by outer conduits 122, are inlet conduits 124 to the cryostats, respectively. These inlet conduits communicate to the annular flow spaces 116a and 116b about their respective inner conduit sections 106a, 106b. Thus recooled Helium II discharges from each cryostat into the respective inner conduit section, flows to the right through the respective section and over the transmission line 100, and then returns to the cryostat through the annular flow space about the respective inner conduit section. Thus, the system of FIG. 2 comprises two separate closed Helium circuits 126a and 126b.

Associated with the Helium circuits 126a, 126b are pumping stations 128a and 128b, respectively. Each pumping station comprises, as before, a porous plug 130 in the respective inner conduit section. The right-hand end of each plug contains an embedded heating coil 132, whereby flow of Helium II is induced through each Helium circuit when the respective heating coil is energized.

Each heating coil is energized, by electrical energy extracted from the transmission line 100 through a tap 134, upon closure of a switch 136. Each switch 136 is operated by a relay 138. Thus far, then, the pumping stations in the transmission system of FIG. 2 are identical to the pumping stations in the transmission system of FIG. 1. Each relay 138 is energized through a temperature responsive control system 140 including a temperature sensing element 142 in the respective conduit section 106a or 106b.

The pumping stations 128a and 128b in FIG. 2 become operative in responsive to the temperature of the Helium II in their respective inner conduit sections 106a and 106b rising to a preset temperature. When this preset temperature is reached in either inner conduit section, the respective relay 138 is energized by its respective control system 140 to close the corresponding switch 136 and thereby energize the corresponding heating coil 132. Helium II is thereby recirculated through the respective Helium circuit 126a or 126b. Accordingly, each pumping station in the system of FIG. 2 is intermittently operable, independently of the other station, to maintain the temperature of the respective transmission line segment at or below a desired operating temperature or its transition temperature.

It will be immediately evident to those skilled in the art that each of the transmission systems of FIGS. 1 and 2 may include as many pumping stations and refrigeration units or cryostats as is necessary to maintain the entire transmission line at or below the desired operating temperature or its transition temperature. It will be further obvious that while the invention has been described with reference to the use of liquid Helium II as a refrigerant, certain features of the invention may be used to advantage in low temperature, low resistance transmission systems using other refrigerants. In the case of such other refrigerants, of course, a suitable pumping means would be employed. As noted earlier such pumping means might be embodied directly in the refrigeration units.

Numerous other modifications in the design, arrangement of parts, and instrumentalities of the invention are possible within its spirit and scope.

I claim:

1. An electrical power transmission system, comprising:
a pair of concentric conduits defining therebetween an annular flow passage communicating at one end with one end of the passage in the inner conduit, the outer conduit being closed at its ends;
an electrical transmission line extending centrally through said inner conduit;
a partition with said inner conduit intermediate the ends thereof, said transmission line extending through said partition;
a first refrigeration unit having an inlet communicating with the other end of said annular passage and an outlet communicating with the other end of said second mentioned passage and;
a second refrigeration unit having an inlet communicating with said second mentioned passage at the side of said partition adjacent said other end of said latter passage and an outlet communicating with said latter passage at the opposite side of said partition; and
means for pumping a refrigerant from the outlet of said first refrigeration unit through said second mentioned passage and said second refrigeration unit to said one end of the latter passage and then through said annular passage to the inlet of said first refrigeration unit.

2. An electrical power transmission system comprising:
a first conduit closed at its ends;
a partition within said conduit intermediate the ends thereof;
a pair of inner conduits extending concentrically through said first conduit at opposite sides of said partition;
there being an annular passage between each inner conduit and said outer conduit, and each inner conduit having a central passage opening at one end to the adjacent end of its respective surrounding annular passage;
a first refrigeration unit having an inlet and outlet communicating with the other ends, respectively, of the central passage in one inner conduit and its surrounding annular passage;
a second refrigeration unit having an inlet and an outlet communicating with the other ends, respectively, of the central passage in the other inner conduit and its surrounding annular passage; and
pumping means for recirculating refrigerant through each inner conduit, its surrounding annular passages and the respective refrigeration unit.

3. An electrical power transmission system comprising:
a first conduit closed at its ends;
a second conduit within and spaced from said first conduit to define an annular flow passage about and communicating at one end with one end of the passage in said second conduit;
a refrigeration unit having an outlet communicating with the other end of said second mentioned passage and an inlet communicating with the adjacent end of said first mentioned passage;

means for recirculating a refrigerant from said refrigeration unit, through said second mentioned passage toward said one end of the latter passage and then back to said unit through said first mentioned passage; and an electrical transmission line separate from and extending centrally through said second conduit.

4. In combination:

a conduit having a passage containing Helium II in its liquid phase;

a porous plug in said passage; and an electrical heating element embedded directly in one end of said plug.

5. An electrical power transmission system according to claim 1 wherein:

said refrigerant is Helium II and said pumping means comprises a porous plug in one of said passages and an electrical heating element embedded directly in one end of said plug.

6. An electrical power transmission system according to claim 2 wherein:

said refrigerant is Helium II and said pumping means comprises a porous plug in one of said passages at each side of said partition and an electrical heating element embedded directly in one end of each plug.

References Cited in the file of this patent

UNITED STATES PATENTS

| | | |
|---|---|---|
| 1,973,068 | Held | Sept. 11, 1934 |
| 2,553,291 | Barr | May 15, 1951 |
| 2,861,119 | Collogne | Nov. 18, 1958 |
| 2,866,842 | Matthias | Dec. 30, 1958 |
| 2,878,300 | Rugg | Mar. 17, 1959 |
| 2,953,667 | Kavanaugh | Sept. 20, 1960 |

OTHER REFERENCES

Keesom, W. H.: Helium, Amsterdam, Elsevier, 1942, pages 312–313.